May 29, 1962 J. V. FOLL 3,037,074

FACSIMILE TELEGRAPHY

Filed April 6, 1960 2 Sheets-Sheet 1

Inventor
J. V. Foll
By Glascock Downing & Seebold
Attys.

May 29, 1962 J. V. FOLL 3,037,074

FACSIMILE TELEGRAPHY

Filed April 6, 1960 2 Sheets-Sheet 2

Inventor
J. V. Foll
By Glascock Downing & Seebold
Attys.

United States Patent Office 3,037,074

Patented May 29, 1962

3,037,074
FACSIMILE TELEGRAPHY

John Victor Foll, Beckenham, England, assignor to Muirhead & Co., Limited, Beckenham, England Filed Apr. 6, 1960, Ser. No. 20,300
Claims priority, application Great Britain Sept. 16, 1959
3 Claims. (Cl. 178—6.7)

This invention relates to facsimile telegraph systems of the type adapted to transmit information written, printed, drawn or similarly carried out on a sheet of flexible material (hereinafter referred to as copy).

In a well known facsimile system the copy is wrapped round a drum which is rotated at constant speed. At the same time a spot of light is caused to traverse the surface of the drum in a direction parallel to the drum axis. The image of the illustrated portion of the copy falls on a photoelectric cell which passes a current proportional to the illumination. The current is amplified and applied to modulate a carrier frequency in a carrier transmission system. The light source, photoelectric cell and associated optical system are generally included in a scanning head. At the receiver the carrier signal is demodulated to recover the original photocell signal. The receiver comprises a drum on which is mounted a sheet of photosensitive material, the drum being rotated at the same speed and in a definite phase relationship with the transmitter drum. The photocell signal is made to control the intensity of a light source which is focused on to the drum as a narrow beam. The light source is included in a recording head which traverses the surface of the drum in the same time as the original copy is scanned at the transmitter, thus exposing the whole of the photosensitive material.

A known facsimile transmission system of the kind described is adapted to transmit a complete page of newspaper, and at a drum speed of 180 rev./min. and 300 lines per inch definition the transmission time is 27 minutes. It is desirable to considerably reduce the transmission time and one method of achieving this is by increasing the drum speed, but several disadvantages occur when this is attempted.

(1) Mechanical problems associated with increase of drum speed are severe. Problems of phasing, freedom from jitter and drum starting power become more difficult as the speed is increased.

(2) Increase of speed demands either increase of light available for exposure of the receiver or the use of extremely sensitive photographic materials which do not possess the high contrast desirable for newspaper reproduction.

The problem of obtaining sufficient light for exposure at scanning speeds in the region of 350 inches per second is a very difficult one.

(3) With increase of speed the deleterious effects of differential delay distortion in the transmission circuit increase rapidly.

An object of the present invention is to reduce the transmission time of a facsimile system of the kind described without increasing the drum speed, thereby obviating the aforesaid disadvantages.

The invention consists of a scanning system for facsimile telegraph systems in which at least two scanning heads are provided at the transmitter for simultaneous scanning of different parts of the copy and are arranged to transmit signals to a like number of recording heads provided at the receiver for simultaneous recording of the different parts of the copy. Conveniently the scanning heads of the transmitter and the recording heads of the receiver can be linked with common lead screws driven from the transmitting and from the receiving drums respectively to ensure like motions of the same.

Thus, for a given drum speed the transmitting time is reduced in proportion to the number of scanning heads employed. The system is particularly suitable for reproducing copy set out in columns such as a newspaper page.

Two particular and at present preferred embodiments of the invention are now described by way of example only with reference to the accompanying drawings in which.

Figures 1, 3, 4:
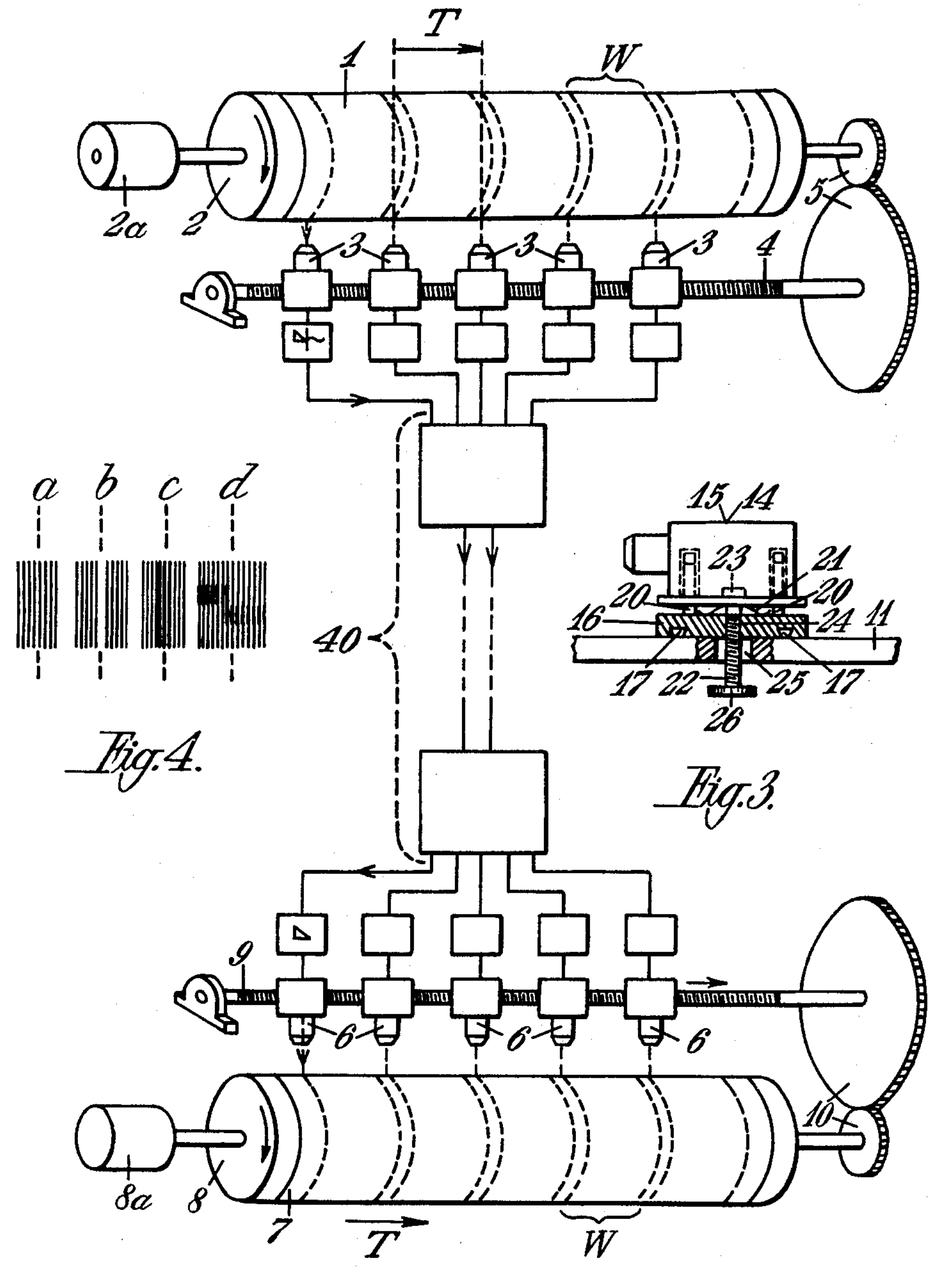
FIGURE 1 is a schematic representation of a transmitter and receiver installation for transmission of five columns of newsprint simultaneously.
FIGURE 3 is an elevation partly in section showing the mode of mounting the scanning and recording heads.
Figure 2:
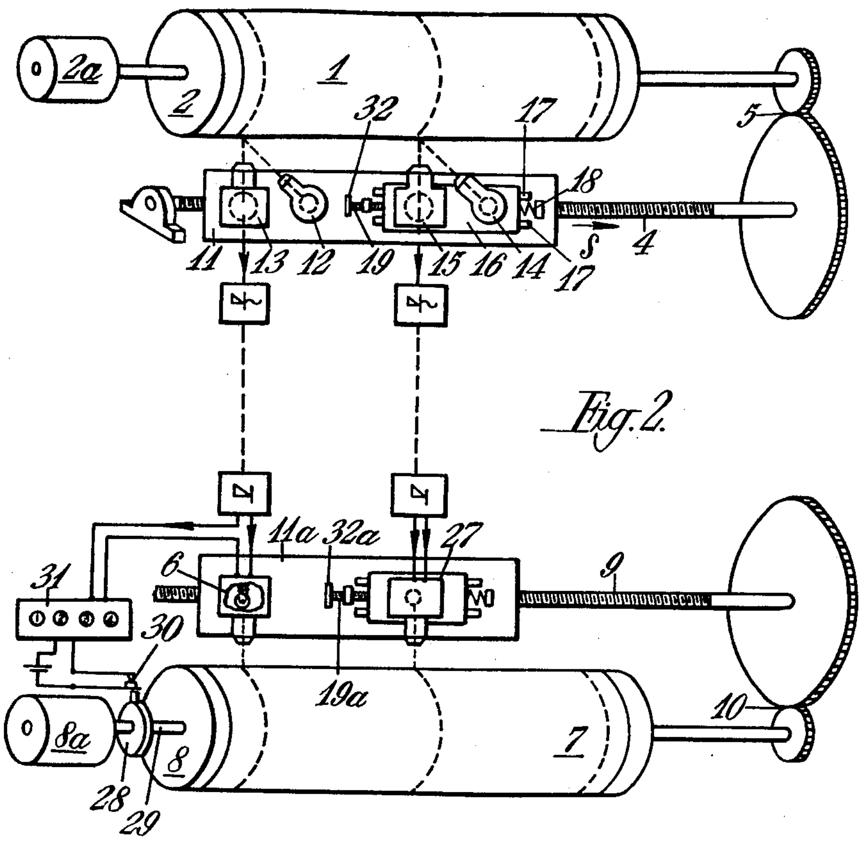
FIGURE 2 is a representation similar to FIGURE 1 of an alternative transmitter and reeceiver installation.
Figure 5:
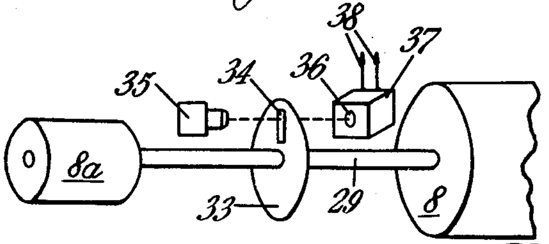

FIGURE 4(*a*), (*b*), (*c*) and (*d*) illustrate respectively a correct, and various defective, recording traces, and FIGURE 5 shows part of FIGURE 2 illustrating an alternative device for actuating a counter.

Referring now ot the embodiment shown in FIGURE 1, the copy 1 is wrapped round a transmitting drum 2 provided with a driving motor 2*a*. Five photo-sensitive scanning heads 3 are mounted at equal intervals T along a lead screw 4 which is coupled with the drum 2 through reduction gearing 5. Each scanning head 3 is linked through one channel of a 5-channel circuit 40 to a series of five recording heads 6 in the receiver each recording head containing a light modulator. Each light modulator controls the intensity of a beam of light projected on to a sheet of photosensitive material 7 wrapped round a receiving drum 8. The recording heads 6 are mounted at equal intervals along a lead screw 9 and reduction gearing 10 identical with the lead screw and gearing of the transmitter. The receiving drum 8 is driven by motor 8*a*. At the commencement of a transmission each scanning head 3 at the transmitter is aligned with the commencement of the column of newsprint which it is to scan as shown in the drawing. The recording heads 6 at the receiver are correspondingly aligned. At the completion of the transmission all scanning and recording heads will have traversed their respective drums for a distance of one column width W simultaneously and the whole of the copy will have been transmitted in the time taken to traverse this scanning distance.

The invention is not limited to one scanning head 3 per column. For example, it is possible with, say, a six-column page to employ three scanning heads each scanning two column widths. Other combinations of columns width and scanning head are possible.

For multiple-head transmission of copy not set out in columns it is necessary to cut as many strips from separate copies of the original as there are scanning heads so that parts of the copy are shown twice on the marginal portions of the strips which are then wrapped round the transmitting drum as separate bands to be severally scanned by the scanning heads. The redundant marginal portions reproduced at the receiver are trimmed off so that a composite image can be pieced together.

This method has however the disadvantage that the composite nature of a page so produced would be visibly evident at the junctions of the sections unless very great care and accuracy were employed in cutting and assembling the sections of the received copy. The disadvantage referred to may be obviated in another embodiment of the invention illustrated in the other figures of the drawings in which like references refer to like parts in FIGURE 1.

FIGURE 2 shows diagrammatically a facsimile transmission system having, for simplicity of presentation, only two scanning heads at the transmitter and two recording heads at the receiver. It should be understood that in accordance with the foregoing the term "scanning head" refers to a combination of a light source and an optical system embodying a photoelectric cell at the transmitter and the term "recording head" refers to a combination of a modulated light source and an optical system at the receiver. Such scanning and recording heads are well known per se.

In the figure, platform or table 11 is adapted to travel for scanning in the direction of the arrow by means of lead screw 4. A transmitting scanning head comprising a light source 12 and optical system 13 is fixed to platform 11. A similar scanning head comprising light source 14 and optical system 15 is mounted on a plate 16 (FIGURE 3) which is slidably mounted on rails 17 fixed to platform 11. A spring 18 maintains lateral pressure against the right-hand end of plate 16 urging it towards the left while adjustable stop 19 provided with an adjusting knob 32 at the left hand end of plate 16 restrains the plate and determines its lateral position, and consequently, the position of the optical axis of optical system 15.

The scanning head 14, 15 is also capable of limited vertical movement on four symmetrically placed pillars 20 two of which are shown in FIGURE 3. The scanning head 14, 15 is urged upwardly by a bow spring or springs 21 and restrained by screw 22, the upper end of which is captive at 23 in said scanning head. Screw 22 also engages a threaded portion 24 of plate 16 and extends downwards through a clearance hole 25 in platform 11, terminating in adjusting knob 26. Thus it will be seen that while the scanning head 12, 13 is fixed with respect to platform 11, the position of the scanning head 14, 15 may be adjusted both laterally and vertically by limited amounts with respect to said platform. Here it should be noted that the distance between the axes of the optical systems of the two scanning heads is sensibly one half of the width of the material on the drum which is to be scanned. This distance may also be expressed in terms of revolutions of the drum.

The mechanical scanning arrangements at the receiver are similar to those at the transmitter, recording head 6 in the receiver being rigidly attached to platform 11*a* and recording head 27 being adjustably mounted. Additionally, at the receiver a cam 28 is attached to drum shaft 29 for the purpose of closing contacts 30 once per revolution of the drum. Each time the contacts 30 close, the battery circuit of an electro-mechanical counter 31 is closed thereby causing the digits dial to advance one digit. Electro-mechanical counter 31 is of the known kind in which the counting dials may be set to any number within the counting range whereupon the counter will count down to zero at which count electrical contacts (not shown in the figure) will open. In this case the said contacts are adapted to open the signal circuit supplying the modulated light source in recording head 6, as shown. Thus it will be seen that if the counter is initially set to the number of revolutions of the drum corresponding to the required recording distance, that is to say, the distance between the optical centers of the two recording heads, and the receiver drum is started, recording will continue until the counter has reached zero whereupon the said contacts will open. This action removes the signal from the modulated light source and recording ceases. For high drum speeds the cam and contact arrangement 28, 30 for actuating counter 31 is likely to be unsatisfactory because of the possibility of contact "bounce." To overcome this difficult, an optical cam or pulse generator might be used as in FIGURE 5 which shows the pertinent parts of FIGURE 2. In the figure, opaque disk 33 having radial slot or aperture 34 is mounted for rotation on drum shaft 29. An optical system embodying a light source 35 focuses a beam of light through window or aperture 36 in enclosure 37 on to a photoelectric device such as a phototransistor or a photo electric cell. Opaque disk 33 normally intercepts the beam of light, but on rotation, the slot 34 periodically allows the light to pass through to the photoelectric device thereby initiating an electrical pulse once per revolution of the disk, said pulse operating the counter (not shown) over conductors 38. If the distance between the two recording heads is correct, recording by recording head 6 will cease at the point that the recording of recording head 27 had previously commenced and the boundary between the two scans will be invisible on the recording as shown in FIGURE 4*a* in which the boundary is indicated by the broken line. If, however, the distance between the recording heads is short then the recording by recording head 6 will cease before the commencement of the record scan by recording head 27 and the boundary will be visible as a blank space (FIGURE 4*b*). On the other hand if the distance between the recording heads is in excess of the required distance the two records will overlap at the boundary, this being visible as a dark line or area (FIGURE 4*c*) due to double recording. These defects may be corrected by suitable adjustments of the knob 32 at the transmitter and/or knob 32*a* at the receiver.

It is also essential for optimum recording to ensure that the axes of each pair of recording heads cut a line which is parallel to the axis of the drum otherwise a discontinuity in the recording will be apparent at the boundary. This defect is shown in FIGURE 4*d* which for simplicity represents a recording of a single line which is shown as short dark segments and may be eradicated by appropriate adjustments of screw 26 on the transmitter scanning head 14, 15 and/or the receiver recording head 27.

This scanning system using two scanning heads of course reduces the scanning time for a complete recording to one half of the time required by the conventional single-head system. It will be apparent that the system may include one fixed scanning head and a plurality of adjustable scanning heads in the transmitter and a corresponding arrangement of recording heads in the receiver. In the initial setting-up procedure the adjustable scanning (or recording) head adjacent to the fixed scanning head is adjusted as hereinbefore explained. This adjustable scanning head is then regarded as a fixed scanning head and the adjacent adjustable scanning head is set up with reference to it. This procedure is repeated until all adjustable scanning heads have been adjusted.

The advantages of the invention may be illustrated by considering the reproduction of a newspaper page 16 inches wide by 22 inches high. The conventional transmitter would have a drum about 23 inches circumference and 16 inches long, and the page would be scanned by a single spot. At 180 rev./min. drum speed and 300 lines per inch definition the page transmission time would be 27 minutes. The transmission bandwidth required for double sideband amplitude modulated transmission is approximately 22 kc./s. By using five scanning heads as described with reference to FIGURE 1 transmission time is reduced to 1/5 and transmission bandwidth increased five times since each of the scanning heads requires its own channel 22 kc./s. wide.

The method does not involve an increase in delay distortion. Good practice in facsimile telegraphy dictates that the delay distortion should not exceed 1/4 of the scanning time for the shortest possible black/white cycle which, in the example given, is about 100 microseconds for 180 rev./min. drum speed. Therefore the delay distortion should not exceed ±25 microseconds over the 22 kc./s. bandwidth. If the drum speed is increased by five times, the permissible delay distortion is reduced to ±5 microseconds over a bandwidth of 110 kc./s. By the use of multiple head transmission in accordance with the invention, since the scanning speed is unaltered, transmission time can be reduced without affecting delay distortion.

I claim:

1. A scanning system for facsimile telegraph systems having a transmitter comprising a drum rotatable at constant speed and about which the copy to be scanned is wrapped, a lead screw extending parallel with the drum, a platform mounted for traversing movement by the lead screw, at least a pair of scanning heads mounted at spaced intervals longitudinally of the platform for simultaneously scanning different parts of the copy, a receiver comprising a drum, lead screw, platform and recording heads corresponding to and driven synchronously with the drum, lead screw, platform and scanning heads of the transmitter, modulated light sources in the recording heads, a circuit by which signals received from the scanning heads of the transmitter are fed to modulate the light sources of the recording heads of the receiver to enable the recording heads to record a facsimile of the copy on the receiver drum, a device operated by each revolution of the drum shaft of the receiver and an electro-mechanical counter operated from said device and adapted to count a specified number of revolutions of said drum shaft and to open a circuit supplying the modulated light source in at least one recording head when said count of revolutions is completed thereby terminating the recording at a point at which recording by an adjacent recording head had previously commenced.

2. A scanning system as set forth in claim 1, said device comprising a cam rotatable with the drum shaft of the receiver and contacts periodically operated upon rotation of said cam, the counter being electro-mechanically operated by said contacts.

3. A scanning system as set forth in claim 1, said device comprising a photoelectric device, a light source adapted to direct a beam of light onto said photoelectric device, an opaque disk provided with an aperture and rotatable with the drum shaft of the receiver, said disk being situated in the light path of said light beam so that the photoelectric device is illuminated only when the aperture passes said light beam, the electro-mechanical counter being operated by electrical pulses from said photoelectric device.

References Cited in the file of this patent

UNITED STATES PATENTS

| | | |
|---|---|---|
| 2,069,061 | Finch | Jan. 26, 1937 |
| 2,160,951 | Alice | June 6, 1939 |
| 2,181,564 | Goldsmith | Nov. 28, 1939 |
| 2,652,448 | Hunt | Sept. 15, 1953 |

FOREIGN PATENTS

| | | |
|---|---|---|
| 1,030,804 | France | Mar. 18, 1953 |